United States Patent
Brady et al.

(10) Patent No.: US 7,519,212 B2
(45) Date of Patent: Apr. 14, 2009

(54) THREE-DIMENSIONAL RECONSTRUCTIONS OF A BREAST FROM TWO X-RAY MAMMOGRAPHICS

(75) Inventors: John Michael Brady, Oxford (GB); Ralph Highnam, Oxford (GB); Shuk Wah Margaret Yam, Stanley (HK)

(73) Assignee: Siemens Medical Solutions USA, Inc., Malvern, PA (US)

( * ) Notice: Subject to any disclaimer, the term of this patent is extended or adjusted under 35 U.S.C. 154(b) by 696 days.

(21) Appl. No.: 10/221,778

(22) PCT Filed: Jan. 31, 2001

(86) PCT No.: PCT/GB01/00414

§ 371 (c)(1),
(2), (4) Date: Dec. 4, 2002

(87) PCT Pub. No.: WO01/69533

PCT Pub. Date: Sep. 20, 2001

(65) Prior Publication Data

US 2004/0094167 A1 May 20, 2004

(30) Foreign Application Priority Data

Mar. 17, 2000 (GB) .................................. 0006598.7

(51) Int. Cl.
*G06K 9/00* (2006.01)
*A61B 6/04* (2006.01)
*A61B 8/00* (2006.01)

(52) U.S. Cl. .......................... 382/132; 378/37; 600/443

(58) Field of Classification Search ......... 382/128–134, 382/154; 378/37, 208, 92, 98.4, 98.6, 101, 378/140; 128/915, 922, 916; 600/407, 419, 600/425, 443, 456, 410, 411, 412, 607
See application file for complete search history.

(56) References Cited

U.S. PATENT DOCUMENTS 5,553,111 A * 9/1996 Moore et al. .................. 378/37

(Continued)

OTHER PUBLICATIONS

Kita et al; "Correspondence Between Different View Breast X-Rays Using a Simulation of Breast Deformation"; Proceedings 1998 IEE Computer Society Conference on Computer Vision and Pattern Recognition, Santa Barbara, CA, Jun. 23-25, 1998, pp. 700-707, XP002169274.

(Continued)

*Primary Examiner*—Abolfazl Tabatabai
(74) *Attorney, Agent, or Firm*—Nixon & Vanderhye, PC

(57) ABSTRACT

Methods are described for the production of a three-dimensional reconstruction of a undeformed object from two different views of the object under deformation using a volume constraint and also by matching corresponding features in the two images. The volume constraint involves assuming that the deformed volume is the same as the undeformed volume, and calculating the deformed volume from one of the images. Further, the deformation of the object can be parameterised by finding corresponding image entities in the each of the images. The method is particularly applicable to breast mammograms in which case the two images are the cranio-caudal (CC) image and medio-lateral oblique (MLO) image whose angular separation varies from 35 to 60 degrees. The image entities which are detected in the two images are microcalcifications, and these are matched by detecting a value representing their volume a looking for matches in this value between the two images.

24 Claims, 4 Drawing Sheets

U.S. PATENT DOCUMENTS

Figure 1:
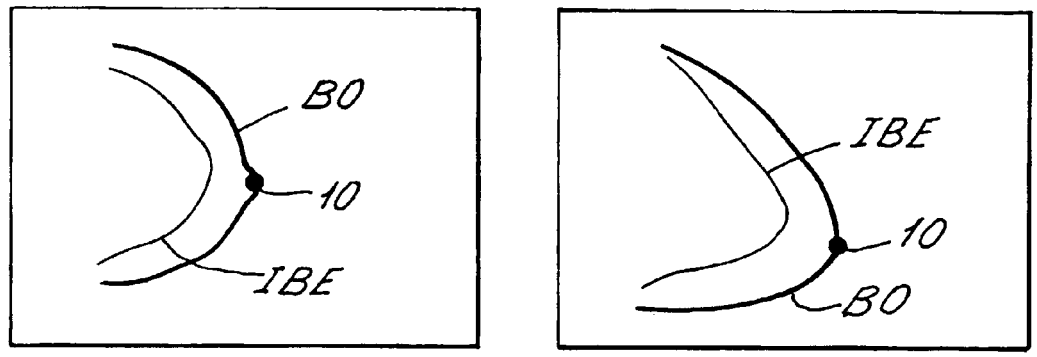

| | | | |
|---|---|---|---|
| 5,633,951 A * | 5/1997 | Moshfeghi | 382/154 |
| 5,883,630 A | 3/1999 | O'Donnell et al. | |
| 6,611,615 B1 * | 8/2003 | Christensen | 382/130 |
| 6,690,762 B1 * | 2/2004 | Berestov | 378/62 |
| 6,738,499 B1 * | 5/2004 | Doi et al. | 382/128 |
| 6,757,423 B1 * | 6/2004 | Amini | 382/154 |

OTHER PUBLICATIONS

INSPEC Abstract Accession No. 6398151, Muller et al, Feb. 22, 1999.

* cited by examiner (A)

(B)

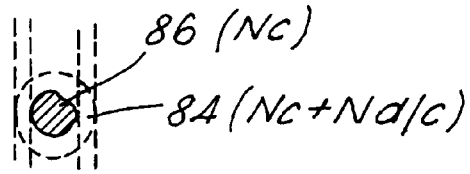
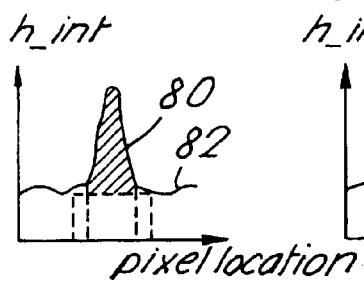
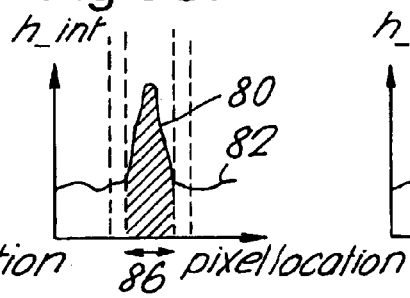
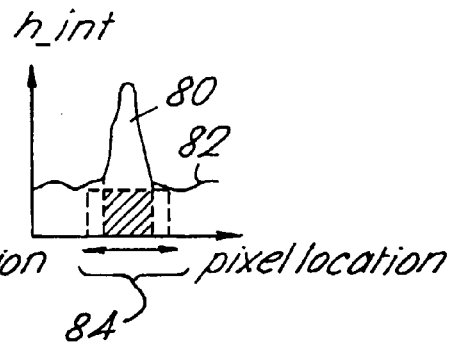
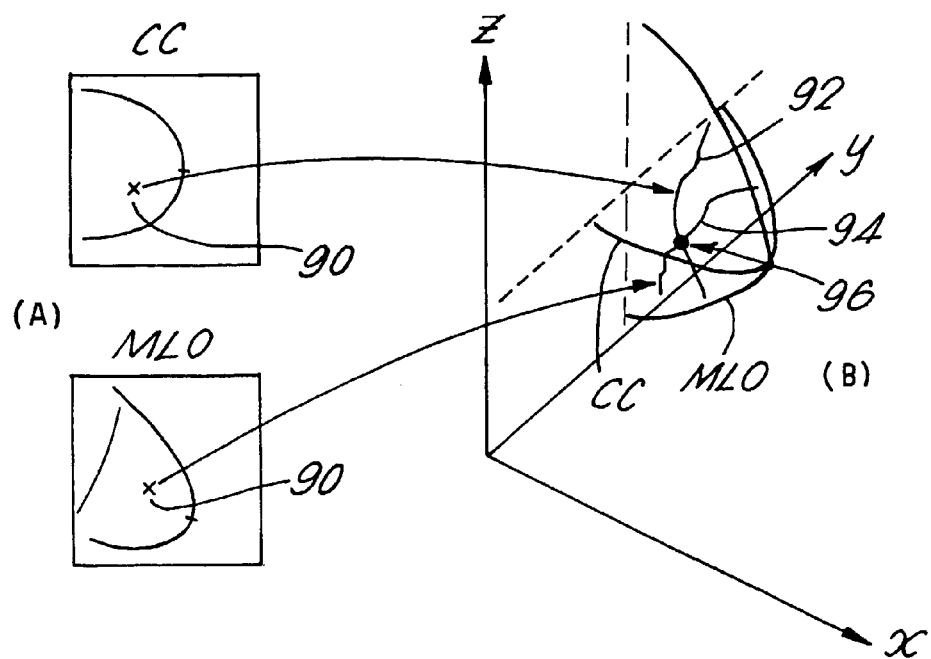

THREE-DIMENSIONAL RECONSTRUCTIONS OF A BREAST FROM TWO X-RAY MAMMOGRAPHICS

This application is the US national phase of international application PCT/GB01/00414 filed 31 Jan. 2001, which designated the US.

The present invention relates to a method for producing a three-dimensional reconstruction of an object from two different images of the object. In particular it relates to the case where the two images, taken from different angles, are of the object under deformation, and what is desired is a three-dimensional reconstruction of the undeformed object.

In an increasing range of applications, and in particular in medical image analysis, there is a requirement to analyse images of objects that are deformed. For instance, the diagnosis of breast cancer almost always involves X-ray mammograms being taken of the "compressed" breast. In the case of X-ray imaging, in which the absorption of X-rays can be harmful to tissue, the breast is compressed in order to reduce to a minimum the possibility of harm to the patient. The breast is compressed between an upper compression plate and a lower plate which consists of the film-screen cassette. Although the term "compression" is typically used in this field, in fact it is more correct to refer to "deformation" because the breast is essentially incompressible and so its volume does not change. In order to construct a three-dimensional reconstruction of the breast it is necessary to combine images taken from different view directions in order to overcome the loss of information by the projective nature of the image. Typically two views of each breast are taken, namely a cranio-caudal (CC) image ("head to toe") and a medio-lateral oblique (MLO) ("shoulder to the opposite hip") image, or the CC and lateral-medial (LM) image.

The angular separation between these views varies according to the woman's size. The angle of the medio-lateral oblique mammogram is at the radiographer's discretion but is typically between 35 and 60 degrees, though this angle is not routinely noted down. Usually, short, stocky women are imaged with angles less than 45 degrees, whilst tall, thin women have angles over 45 degrees. It also is important to note that the degree of compression of the breast is significantly different between the two views. For instance, the compression for the CC view may be 5 cm and the compression for the MLO view 6 cm.

These variations makes three-dimensional reconstruction a very difficult problem. A considerable amount of work has been done in the field of stereo vision in general and this has produced a number of algorithms that can be used to make three-dimensional reconstructions from different images. However, much of this relates to so called "narrow angle stereo vision" in which the angular separation between the two images is often less than 10 degrees. In such a case most image points in one pair of stereo images have a counterpart in the other and for each small region in the lefthand image there is a closely similar region in the right hand image. However, this does not apply in the case of X-ray mammograms where the angular separation is much larger. Furthermore the substantial, and different, compression of the breast in mammography means that points in one image which correspond to a given point in the other image do not lie along a straight line as in normal narrow angle stereo vision. Thus the algorithms used in narrow-angle stereo vision are not useful in reconstruction from mammograms.

Some proposals have been made for combining wide-angle views, but these are based on a rigid body transformation between the two views, which is clearly not the same for mammograms for different compressions, and also assumes that the scene can be modelled using a simple geometry using polyhedra, which again is not suitable for mammography.

In the field of mammography proposals have been made to allow the matching of the same view of the same breast at two different times (essentially just comparing two time separated images) or the same view of the two breasts at the approximately the same time, but again compression is not considered nor the matching of views from different angles. A technique known as tomosynthesis has been proposed which involves holding a breast in one position and translating an X-ray tube to a sequence of different positions along a straight line trajectory. However, this does not take into account the compression problem, nor does it enable the reconstruction of a three dimensional model of the breast from existing CC and MLO views. Given that millions of pairs of stored CC-MLO views are available, it would be very useful to be able to provide a three-dimensional reconstruction from those two views.

The paper by T. Müller et. al. "Volume reconstruction of clustered microcalcifications in mammograms"; *Digital Mammography*, pp.321-328, Kluwer Scientific Publishers, 1998 requires the user to identify corresponding microcalcifications in each of the CC and MLO images and it then suggests modelling the different compression between the two images as a uniform scaling of one of the images. However this leads to a uniform (affine) transformation between the two images which is a very poor approximation to the varied transformation across the CC image, corresponding to different anatomical structures.

A different technique for CC-MLO matching and uncompression of a breast has been proposed by Kita; Highnam and Brady in "Correspondence between two different views of X-ray mammograms using simulation of breast deformation"; *Proceedings of CVPR*, 1998.

Figure 2:
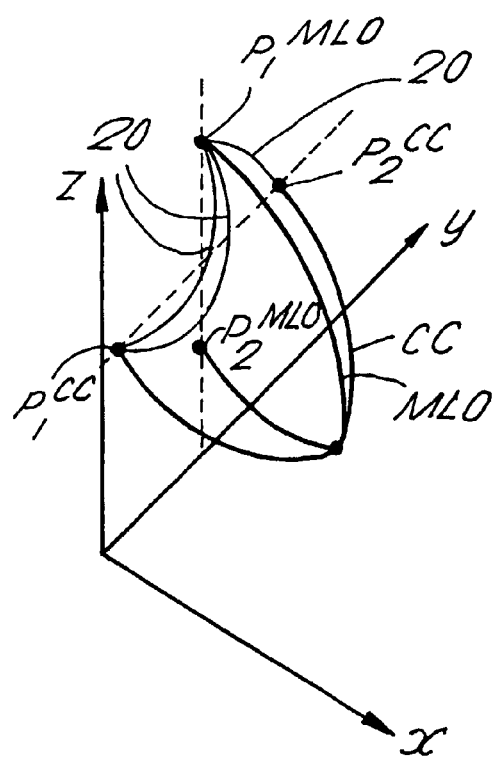

In this technique, as illustrated schematically in FIGS. 1 and 2 of the accompanying drawings, first, the outlines BO of the breast and the nipple positions 10 from both the CC and MLO image are detected manually as shown schematically in FIGS. 1A and B. A number of techniques are available to do this, for example the breast outline can be found on the basis of quantum noise characteristics inside the breast and on the film. Once the outlines and nipples are detected, the 3-D uncompressed breast shape is then reconstructed automatically by aligning the two outlines at the nipple position in the 3-D coordinate frame such that the CC and MLO outlines lie, respectively, on the horizontal and vertical plane, and intersect at the nipple position as shown in FIG. 2. On each plane parallel to the chest wall, four estimated points, $P_1^{CC}$, $P_2^{CC}$, $P_2^{MLO}$ and $P_2^{MLO}$, on the breast surface are obtained, two each from the CC and MLO outlines. The remainder of the uncompressed breast surface is then modelled as part of a parametric surface, for example an ellipse 20, passing through each pair of estimated surface points, $P_i^{CC}$ and $P_i^{MLO}$, where $i \in \{1,2\}$.

Figure 3:
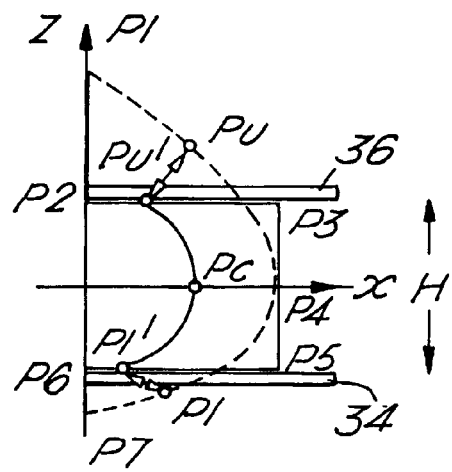

FIG. 3 shows a schematic of a cross-section of the CC compressed breast according to Kita et al's model. The dashed curve P1 P4 P7 represents the uncompressed breast outline, which is taken as one of the slice cross-sections of the 3-D reconstructed breast. The solid line segments P1 P2, P2 P3, P3P5, P5P6 and P6 P7 represent the compressed breast outline. The compressed breast thickness, H, can be measured or estimated using a model-based algorithm such as that given in R. P. Highnam and J. M. Brady; "*Mammographic Image Processing*", Kluwer Academic Publishing, 1999.

Assuming that the breast surface stretches (or shrinks) by a constant factor under (un)compression, a point $P_u$ on the uncompressed breast outline can be mapped to point $P'_u$ on the compressed outline using simple ratio, and likewise for points $P_l$ and $P'_l$. Points in the mid-plane, i.e. z=0 plane, are assumed to remain undeformed under (un)compression. Thus, $P_c$ remains in the same coordinate position after compression. Finally, curves $P_cP'_u$ and $P_cP'_l$ are modelled by quadratics. Using these assumptions, every point in the 2-D CC image has a corresponding curve in the 3-D uncompressed breast after simulation of uncompression (as can be seen in FIG. 9 by comparing point 90 in the MLO and CC views of FIG. 9A with the corresponding curves 92, 24 in the uncompressed reconstruction of FIG. 9B).

However, there are problems with this approach. The compressed outline is used in the reconstruction, but this does not take into account the deformation of the breast edge under compression, and actually results in a reconstructed breast which is much larger than the actual one. Further no account is taken of variation in the compression through the breast structure.

The present invention is directed to improving the production of a 3-D reconstruction from two views of a deformed object. A computer system may be programmed to perform the methods described herein and a computer program may include program code adapted to perform these methods.

In more detail, a first aspect of the invention provides a method of producing a three dimensional representation of an undeformed object by combining information from two images taken from different viewpoints of the object under deformation, estimating the volume of the deformed object, and constraining the three dimensional model of the object to have substantially the same volume.

The deformation of the object may differ between the two images and the volume of the deformed object may be estimated from one of the images, for instance by summing over the image the volume of slices of the object parallel to the imaging direction. This may involve estimates about the shape of the surface of the deformed object.

The information from the two views can be combined by detecting the outlines of the object, reducing the areas outlined by a predetermined amount and using the reduced areas as profiles for the reconstruction. This may be performed in an iterative process in which the volume of the reconstruction is compared to the volume of the deformed object and the areas successively reduced until the reconstructed volume is substantially equal to the volume of the deformed object. The amount of reduction of the areas can be different in the two views in accordance to the differing deformations between the two views.

The invention also provides a method of parameterising the deformation of an object using at least one of the parameters of: the linear displacement of the interior of the object, the rotational displacement of the interior of the object, and the stretching of the surface under the deformation.

Where the deformation of the object differs between the two images, the parameter representing the stretching of the surface may be calculated for each of the images. The parameters may be calculated by detecting corresponding entities in the two image entities and setting the deformation parameters to bring the corresponding image entities into registration in the three-dimensional representation of the undeformed object.

It will be appreciated that these methods are particularly applicable to reconstructions of the human breast from breast mammograms for instance CC and MLO or LM images. In this case the corresponding image entities used for setting the parameters can be microcalcifications.

It was mentioned above that a method for matching CC and MLO images has been proposed by requiring the user to locate corresponding microcalcifications in each of the images. However, another aspect of the present invention provides a method of automatically detecting corresponding microcalcifications in two mammograms of a breast. The two mammograms may be taken from different directions (such as the CC and MLO images), or may be using different imaging conditions such as time of exposure or breast compression. The method is based on using the $h_{int}$ representation of a mammogram explained in R. P. Highnam and J. M. Brady; *"Mammographic Image Processing"*, Kluwer Academic Publishing, 1999, and also in the papers "Mammographic Image Analysis" by Highnam, Brady and Shepstone; European Journal of Radiology 24 (1997) 20-32, and also "A Representation for Mammographic Image Processing" by Highnam, Brady and Shepstone, Medical Image Analysis 1996; 1: 1-19. It will be recalled that in this representation the mammogram is converted into a representation in which for each pixel values $h_{int}$ and $h_{fat}$ are calculated representing the length of interesting tissue and length of fatty tissue through which the X-rays pass to get to that pixel. Such values can easily be converted into a volume by multiplying by the area of the pixel.

Thus another aspect of the present invention provides for detecting corresponding microcalcifications in two views by calculating such a volume value $v_{int}$ for each microcalcification in the two images. This is the sum of the $h_{int}$ values for that microcalcification multiplied by its area. The values of $v_{int}$ for the microcalcifications in the two images are compared together, and those with the same or very similar values of $v_{int}$ are taken to be the same microcalcification.

Preferably the calculation of the value $v_{int}$ includes the step of deducing the contribution of non-calcified tissue within the area of the image of the microcalcification. In other words, because each value of $h_{int}$ is representative of a "pencil" shaped volume of tissue extending from the pixel in the direction of the X-ray source, and the microcalcification is only a small part of that pencil, it is preferable to deduct the contribution of the remaining tissue in the "pencil". This contribution can conveniently be estimated by looking at the $h_{int}$ value of tissue in the area surrounding the microcalcification. Because microcalcifications are small, the contribution of background tissue within the image area of the microcalcification can be assumed to be the same as the $h_{int}$ value outside that area. Conveniently the surrounding area can be isolated by dilating the image of the microcalcification and deducting the area of the microcalcification itself. The values of $h_{int}$ in the surrounding area can either be averaged, or a plane fit can be made to them, or some other estimate based on those values can be made.

Figure 4:
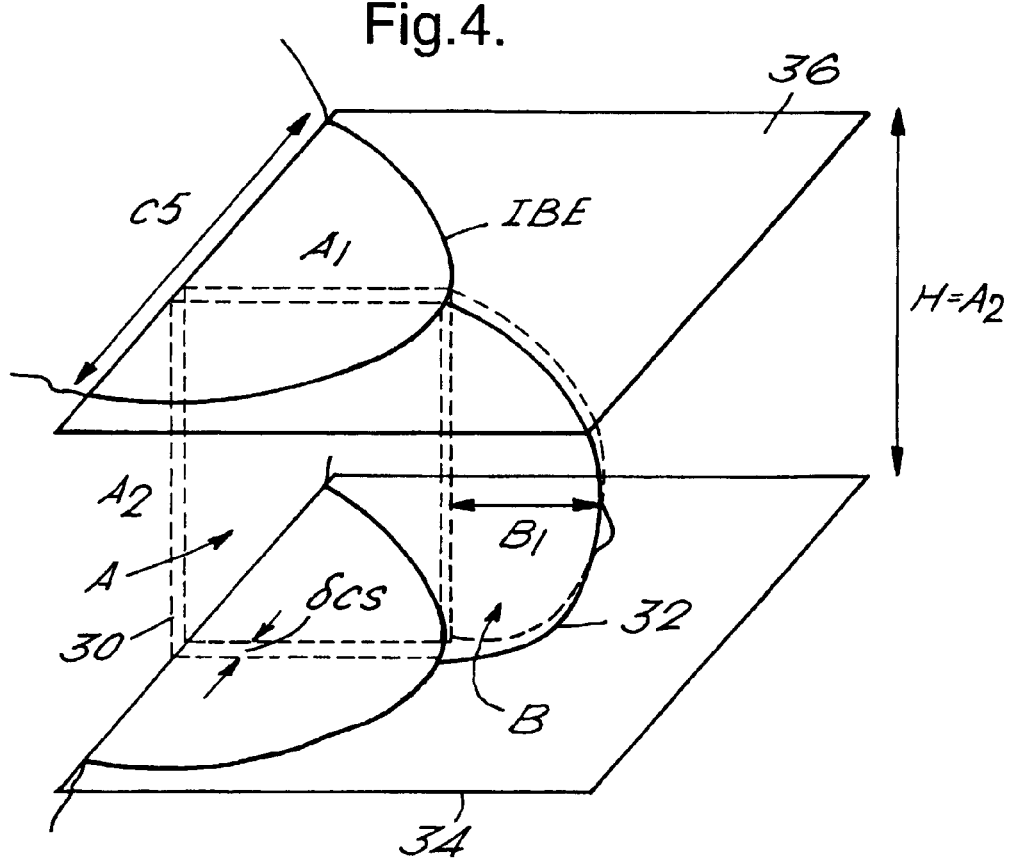
Figure 5:
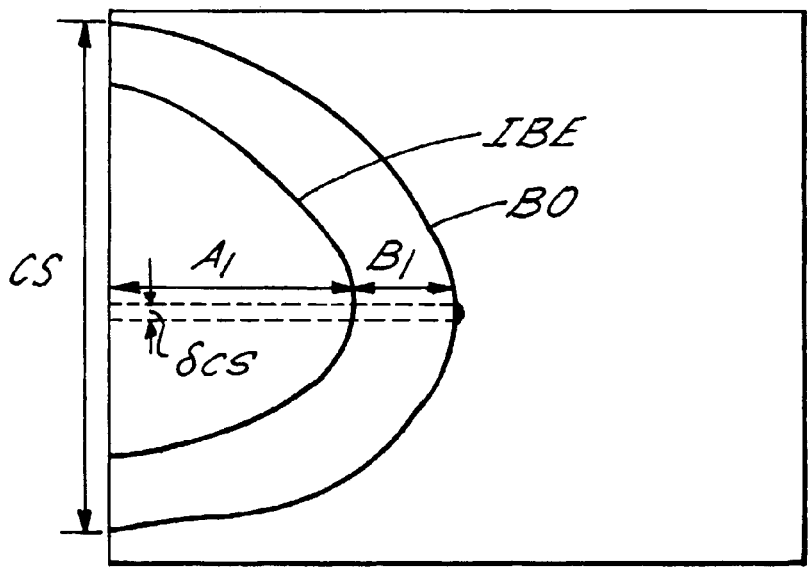
Figure 6:
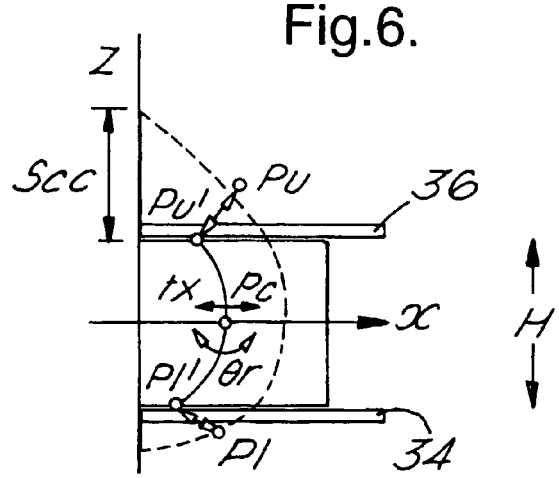
Figure 7:
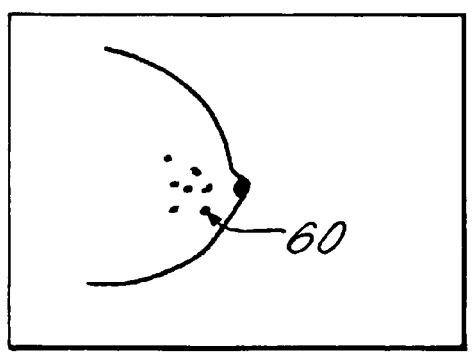
Figure 7:
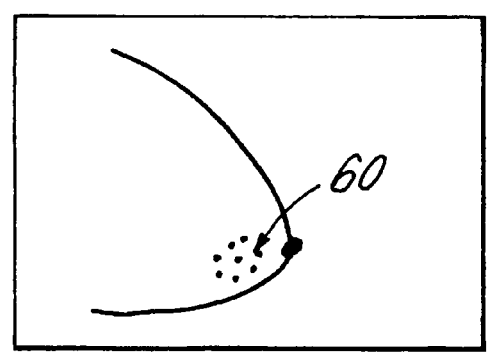

The present invention will be further described by way of non-limitative example with reference to the accompanying drawings in which:

FIG. 1 schematically illustrates two typical mammogram views;

FIGS. 2 and 3 illustrate a prior art process for reconstruction of a 3-D representation of the breast;

FIG. 4 schematically illustrates the concepts used in the reconstruction process of an embodiment of the present invention;

FIG. 5 is a top view corresponding to FIG. 4;

FIG. 6 schematically illustrates other concepts used in reconstructions process of FIG. 4;

FIG. 7 schematically illustrates two further mammogram views.

FIG. 8 illustrates another aspect of the reconstruction process of the embodiment of the present invention; and FIG. 9 illustrates the matching of microcalcifications in two mammogram views and the reconstruction of the microcalcification in the 3-D representation.

A first aspect of the invention is concerned with improving the process of reconstructing a 3-D representation of an undeformed object, such as the breast, from two views of the deformed object (for instance the two typical mammographic views). In the reconstruction process discussed above with reference to FIGS. 2 and 3 the compressed breast outlines in the CC and MLO mammograms are equated with the three-dimensional reconstructed breast outline. However, as the breast is placed upon and then flattened between, the compression plate and the film-screen cassette, the breast edge is pushed forwards and outwards from the chest wall in order to maximise the image breast area. Using the compressed outline in the reconstruction is therefore incorrect. The first aspect of the invention is concerned with improving this process and involves applying to the reconstruction process the constraint that the compressed breast volume $V_c$ should be approximately equal to the uncompressed volume $V_u$. Although the term "compression" is typically used in mammography, in fact, in the context of X-mammography it refers to the deformation of the breast as the breast is squashed and does not imply reduction in volume in the physical sense.

In order to apply the volume conservation constraint it is necessary to obtain the volume of the compressed breast from the mammogram. This can conveniently be done from the CC image of FIG. 1A using the concept illustrated in FIGS. 3 and 4. This schematically illustrates a breast compressed between an upper compression plate 36 and the film-screen cassette 34. First the breast outline BO and the inner breast edge IBE are detected in the CC mammogram. The inner breast edge is the curve on the mammogram where the compressed breast surface starts to fall from the compression plate and is illustrated as BE in FIGS. 3 and 4. This can be detected as the $h_{int}=0$ line when using the $h_{int}$ representation described above. The volume of a vertical slice can then be found as illustrated in FIGS. 3 and 4 by summing for each slice the volume of the rectangular region A and the approximately semi circular region B. For a slice of thickness δcs the volume of region A is just its height multiplied by its width:

$$A_1 \times A_2$$

The value $A_2$ is equal to H, the compressed breast thickness, and this can either be noted when taking the mammogram, or can be estimated by the techniques disclosed in R. P. Highnam and J. M. Brady; "*Mammographic Image Processing*", Kluwer Academic Publishing, 1999. The value $A_1$ can be measured from the mammogram.

To estimate the volume of region B, the shape of the free edge 32 at the front of the breast between the compression plates 34, 36 needs to be estimated. Conveniently this is estimated as being a function of $B_1$ and H. For example if it were assumed to be semicircular then the cross sectional area of region B would be $\pi(H/2)^2$ though in fact a quadratic assumption provides a better estimate.

The volume of the two regions A and B are then just obtained as the cross sectional area multiplied by the slice thickness δcs.

The volume of the compressed breast can then be found by summing all of the slices over the width cs as follows:

$$V_c = \sum_{cs}(A+B)\delta cs$$

It is then necessary to apply this estimated volume in the reconstruction process. In this embodiment the reconstruction process of Kita et al as described above is used with the modification that the breast areas in the CC and MLO image are each reduced by a predetermined amount before being combined in the 3-D reconstruction. Conveniently the predetermined amount is a circular structuring element of a certain radius. One way to achieve this is to use the techniques of mathematical morphology as detailed in the book by Serra. In particular mathematical morphology introduces operations such as erosion and the idea of a structuring element that has a characteristic shape and a size. One way to reduce the area of the breast is to erode it using a circular structuring element of a suitable radius. It should be noted that the two areas in the CC and MLO images are not eroded by the same amount because the amount of compression is generally different between the two images. Thus the ratio of the amount of erosion of the CC and MLO breast area is inversely proportional to the ratio of their respective compressed breast thicknesses. For instance if the compressed breast thickness in the CC view is 5 cm and in the MLO view is 6 cm then the amount of erosion ΔCC for the CC view is related to the amount of erosion ΔMLO for the MLO view as follows:

$$\Delta CC = \frac{6}{5}\Delta MO$$

The outlines of the eroded breast area are used to form the 3-D reconstruction as in the prior art method and the volume of the reconstructed breast is calculated and compared to the compressed volume found above. The initial amount of erosion is chosen so that the volume of the reconstruction will still be larger than the compressed volume. Thus the steps of erosion and reconstruction can be performed iteratively until the reconstructed volume approximates the compressed volume. Erosion here refers to the well-known technique from mathematical morphology detailed above.

A second aspect of the invention relates to parameterising the deformation of the breast. Breast compression is a complicated process to model precisely because the deformation of the breast depends not only on breast tissue composition, but also on how the radiographer positions the breast between the compression plate 36 and the film-screen cassette 34. This means that mammograms of the same breast taken at two slightly different times are often very different. Even if the breast outlines BO and nipple positions 10 approximate in the two mammograms, the tissue will configure differently with different compression. The prior art reconstruction process of Kita et al mentioned above does not take into account variations in the compression process so given two identical breast outlines and nipple positions in two views, the reconstructed breast will always be the same. The second aspect of the present invention involves incorporating the following parameters as a model of the deformation process:

translation in the x-direction ($t_x$)

$t_x$ refers to the shift of breast tissue in the x-direction, i.e. the direction perpendicular to the chest wall, as the breast is compressed.

local rotation angle ($\theta_r$)

$\theta_r$ deals with the amount of local rotation of some anatomical structures about a fixed point in the surroundings as the breast is compressed. In our case, it is the local rotation of a microcalcification about the centroid of the cluster.

skin stretching parameter in CC compression ($s_{cc}$)

$s_{CC}$ models the amount of breast surface being squeezed between the compression place and the film-screen cassette. Effectively, $s_{CC}$ controls where a point on the breast surface maps to on the compressed outline and this in turn determines the curvature of the resulting uncompressed curve.

skin stretching parameter in MLO compression ($s_{MLO}$)

$s_{MLO}$ is the MLO equivalent of $s_{CC}$ under CC compression.

The parameterised model is illustrated in FIG. 6.

These parameters are set as described in a later section using ground truth/known matches from the image pair. These optimised parameter values are then used to determine the 3-D position of the remaining calcifications.

The third aspect of the invention relates to a method of matching microcalcifications from two mammographic views, in which enables the production of a three-dimension reconstruction of the microcalcification cluster. In order to achieve this the detected microcalcifications in the two views have to be matched up. FIGS. 7A and B schematically illustrate the CC and MLO images respectively of a breast including a microcalcification cluster 60. As discussed above the existing stereo vision techniques are not suitable for matching microcalcifications in such views because of the particularly wide angle between the CC and the MLO views in breast mammograms which gives a great deal of "correspondence" ambiguity between the two views. This aspect of the present invention matches the microcalcifications in quite a different way based on the $h_{int}$ representation of the mammogram discussed above. In fact the $h_{int}$ values are converted into a volume representative value $v_{int}$ which represents the volume of "interesting tissue" within the calcification region. Because $v_{int}$ is a normalised quantity, the same calcification should have approximately the same value of the $v_{int}$ under any variation in the imaging process, be it projection, time-of-exposure or breast compression.

It will be recalled that the value of $h_{int}$ represents the amount of interesting tissue in a pencil volume through the breast with the base of the pencil being the pixel in the mammogram, the pencil extending towards the X-ray source. Thus for image pixels within the area of a microcalcification, although only microcalcification is visible in the image, in fact pencil volume of tissue contributing to this pixel will include not the microcalcification but also other interesting tissue above and below it. In order to isolate the microcalcification it is necessary to remove the contribution of the other interesting tissue. Thus the value $v_{int}$ (which is obtained from $h_{int}$ by multiplying $h_{int}$ by the area of the pixel $p_2$) needs to be calculated as:

$$v_{int} = v_{int}^{calc+surr} - v_{int}^{surr}$$

Where $v_{int}^{calc+surr}$ is based on the total sum of all $h_{int}$ values of all pixels within the area of the microcalcification which include the contribution of the calcification plus that of the background tissue. $v_{int}^{surr}$ is the interesting volume of just the background tissue.

To estimate the contribution of the background tissue it is assumed that the background tissue is the same as the tissue in the immediate surroundings of the microcalcification. Thus by looking at an image area surrounding the microcalcification, values of $h_{int}$ can be obtained from them, for instance averaged. This area is obtained in this embodiment by looking at a dilated region around the calcification region, and subtracting from the dilated region the area of just the calcification. In fact because microcalcifications are small, the assumption that the contribution of background tissue within the area of the microcalcification is equal to the value from background tissue outside the area of the microcalcification is reasonable. FIGS. 8A to 8D illustrate the relationship between the microcalcification region 86 and dilated region 84. It can be seen from FIGS. 8B to 8D that the microcalcification gives rise to a peak 80 in the value of $h_{int}$. This is superimposed on a background value 82 of $h_{int}$ which is approximately constant. What is wanted is the volume of the peak 80 without the substantially constant base level 82 i.e. the shaded region in FIG. 8B. In the $h_{int}$ representation from the mammogram the value of $h_{int}$ within the microcalcification consists of the shaded region shown in FIG. 8C, i.e. the sum of the two. By looking at the $h_{int}$ value of the pixels outside the peak, i.e. in the dilated region 84 in FIG. 8D, and subtracting those pixels within the microcalcification region (the region 86), the background value 82 of $h_{int}$ can be estimated. This can then be removed from the value within the microcalcification region. Mathematically, $$v_{int}^{calc+surr} = \sum_{i \in r_e} h_{int}(i) \times p^2$$

$$v_{int}^{surr} = h_{int}^{surr} \times N_C \times p^2$$

where i is the ith pixel of the calcification region; p is the pixel size; $N_c$ is the number of pixels within the calcification region; and $$h_{int}^{surr} = \Sum_{i \in_c \backslash r_c} h_{int}(i)/N_{d/c}$$

Where $N_{d/c}$ is the number of pixels in just the dilated region and $r_d$ and $r_c$ denote the dilated region and calcification region respectively.

It should be noted, however, that the background value can be estimated in a number of other ways, for instance with a plane fit rather than an average.

Having calculated the value $v_{int}$ for each microcalcification in each of the two views, a match score S can be computed to indicate the goodness of the match using the values from each of the images:

$$S = \frac{|v_{CC} - v_{MLO}|}{v_{CC} + v_{MLO}}$$

where $v_{CC}$ and $V_{MLO}$ are the $v_{int}$ values of a calcification region detected in the CC and MLO view respectively. The values of S range from [0,1] with a perfect match having a score of 0.

Thus this method allows microcalcifications detected in each of the two views to be matched up and denoted as corresponding to each other. If this method is combined with the parameterised deformation model above, it is possible to reconstruct a three-dimensional model of the cluster of microcalcifications. To do this the match score for all possible pairs of calcifications detected in the CC and MLO images is computed, and those pairs with low match scores (i.e. with similar $v_{int}$) are retained as confident matches as illustrated by microcalcification 90 in FIG. 9A. Knowing that these microcalcifications correspond to each other between the two views, they can be used to fixed the set of parameters in the deformation model.

For each of these confident matches, two uncompressed curves 92, 94 as shown in FIG. 9B can be generated in the 3-D uncompressed breast, one for each of the CC and MLO compression. The set of compression parameters are then chosen such that the uncompressed curves 92, 94 of each confident match intersect, or are closest to each other. Let $d_n(i)$ be the nearest distance between the CC and MLO uncompressed curves of the ith confident match. The minimisation problem can be written as:

$$\hat{p} = \underset{p}{\operatorname{argmin}} \frac{\sum_i d_n(i)}{\sum_i}$$

Once the compression parameters are fixed, the rest of calcifications in the two views are matched up such that the uncompressed curves of each matched pair either intersect or are closest to each other.

The final 3-D position of a calcification 90 in the uncompressed breast is taken as the intersection point of the uncompressed curves 92, 94 or the mid-point between the closest points on the two uncompressed curves of a matched pair as shown by point 96 in FIG. 9B.

The invention claimed is:

1. A method of producing a three dimensional representation of an undeformed object, the method comprising: using a computer to perform steps including: combining information from two 2D images taken from different viewpoints of the object under deformation, estimating the volume of the deformed object, and constraining the three dimensional representation of the object to have substantially the same volume, wherein the information from each of the two images is combined by the steps of: (a) detecting the outline of the object in each of the two images, (b) reducing area of the outlined areas by a predetermined amount, and (c) using the outlines of the reduced areas as profiles from different directions of the three dimensional representation of the object.

2. A method according to claim 1, wherein the deformation of the object differs between the two images.

3. A method according to claim 1 wherein the volume of the deformed object is estimated from one of the images.

4. A method according to claim 3 wherein the volume of the deformed object is estimated by summing over the image the volume of slices of the object parallel to the imaging direction.

5. A method according to claim 1 wherein the volume is estimated by assuming at least part of the surface of the deformed object to be a parametric surface.

6. A method according to claim 1 further comprising the steps of: (d) calculating the volume of the three dimensional representation of the object, (e) comparing it to the estimated volume of the deformed object, and iterating steps (b), (c), (d) and (e) until the volume of the three dimensional representation of the object is substantially equal to the estimated volume of the deformed object.

7. A method according to claim 1 wherein the three dimensional representation of the object comprises parametric surfaces passing through the said profiles.

8. A method according to claim 1 wherein the outlines of the reduced areas are used as profiles from orthogonal directions.

9. A method according to claim 1 wherein the amounts of deformation of the object differs between the two images and the predetermined amounts by which the outlined areas are reduced in the two images differ in accordance with the respective amounts of deformation.

10. A method according to claim 1 wherein the object is deformed parallel to one of the imaging directions.

11. A method according to claim 1 wherein the object is deformed by compression.

12. A method according to claim 1 wherein the object is a human breast.

13. A method according to claim 12 wherein the images are breast mammograms.

14. A method according to claim 13 wherein the images are taken in the cranio-caudal (CC) and medio-lateral oblique (MLO) directions or CC and lateral-medial (LM) views.

15. A method according to claim 14 wherein the volume of the deformed breast is estimated from the CC or MLO or LM image.

16. A method according to claim 1 further comprising parameterising the deformation of the object.

17. A computer program embodied in a computer readable medium and comprising program code adapted to perform the method of claim 1.

18. A method of detecting correspondences between microcalcifications in two mammogram images of a breast, the method comprising: using a computer to perform steps including: converting the two images into an $h_{int}$ representation representing the thicknesses of interesting tissue and fat in regions of the breast contributing to the mammograms, calculating a value $v_{int}$ representing the interesting volume for each microcalcification based on a sum of the values of $h_{int}$ for all pixels within the image of the microcalcification, comparing the values of $v_{int}$ for each microcalcification in one image with each microcalcification in the other image to detect as corresponding those whose $v_{int}$ values match to a predetermined degree.

19. A method according to claim 18 wherein the calculation of the value $v_{int}$ for each microcalcification comprises summing for all pixels within the image of the microcalcification the value of $h_{int}$ multiplied by the area of the pixel.

20. A method according to claim 18 wherein the calculation of the value $v_{int}$ for each microcalcification further comprises deducting the contribution of non-calcified tissue within the area of the image of the microcalcification.

21. A method according to claim 20 wherein the contribution of non-calcified tissue is estimated on the basis of the value of $h_{int}$ in the area of the image surrounding the microcalcification.

22. A method according to claim 20 wherein the contribution of non-calcified tissue is estimated on the basis of the average of the value of $h_{int}$ in the area of the image surrounding the microcalcification.

23. A method according to claim 20 wherein the contribution by non-calcified tissue is calculated by converting the value of $h_{int}$ in the area of the image surrounding the microcalcification into a volume representative value by multiplying the values of $h_{int}$ for each pixel in the surrounding area by the area of each pixel and the number of pixels in the surrounding area.

24. A computer program embodied in a computer-readable medium and comprising program code adapted to perform the method of claim 18.

* * * * *